UNITED STATES PATENT OFFICE.

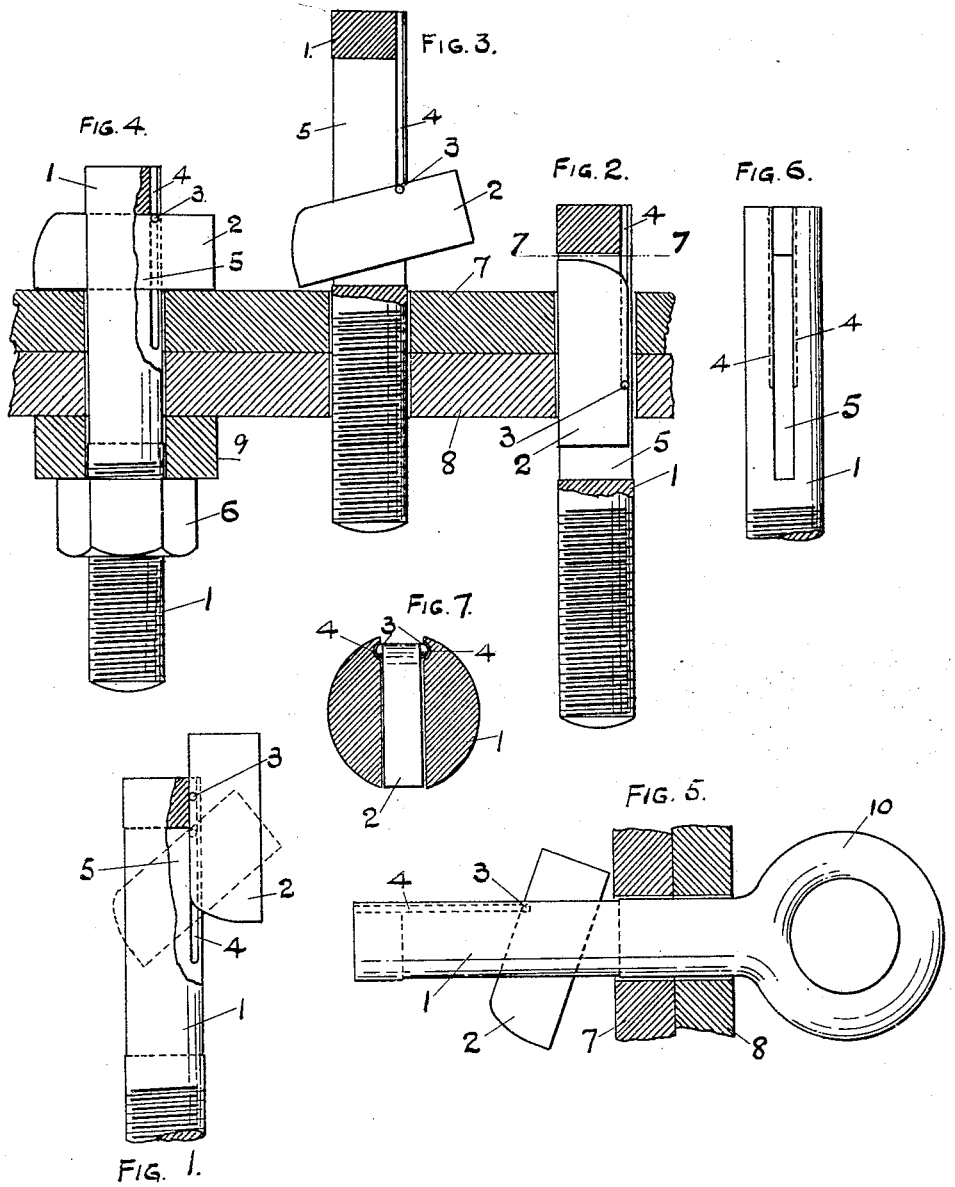

JOHN WATT, OF BALTIMORE, MARYLAND.

AUTOMATIC KEY BOLT.

1,410,042.  Specification of Letters Patent.  Patented Mar. 21, 1922.

Application filed February 14, 1921. Serial No. 444,975.

*To all whom it may concern:*

Be it known that I, JOHN WATT, a subject of Great Britain, residing at Baltimore city, in the State of Maryland, have invented a certain new and useful Automatic Key Bolt, of which the following is a specification.

My invention relates to an improved securing means for securing plates or other bodies together, and has for its object the providing of an automatic key bolt as one end of the securing means.

A further object of my invention is the providing in a securing means an automatic holding device.

A further object of my invention is the providing of a simple holding means, easily assembled and easy of engagement and disengagement, operative from the other end of the holding means.

A further object of my invention is the providing in a securing device automatic holding means on one end thereof, operative in any position of the axis of the said securing device with reference to the horizontal.

A further object of my invention is the providing in a securing bolt, which may be inserted through a hole of substantially its diameter, an automatically formed head on said bolt controlled from the outside and conversely releasing said head controlled from the outside when desired, so that the bolt may be removed.

With the foregoing and other objects in view, my invention consists of the novel construction, combination and arrangement of parts as illustrated in the accompanying drawings, wherein is shown the preferred embodiment of my invention, but it is understood that changes, variations and modifications may be resorted to which come within the scope of the claims hereunto appended.

In the specifications, when I use the term bolt, I use it as the end of a working device desired to be secured and it may consist of an ordinary screw bolt (stud) without a head and provided with my improved key, or it may be an eye bolt or other rod or projection from an object to be secured.

In the drawing of the herein described embodiment of my invention, Figure 1, is a view in elevation, partly in section of the end of a bolt provided with my improved key securing means, and shows the key being introduced into the same. Fig. 2, shows the same bolt, in elevation, partly in section, with the key in closed position being introduced in holes in two horizontal plates to be secured together. Fig. 3, is the same bolt in elevation, partly in section, inserted through said plates and the key automatically dropped into open position; Fig. 4, is the same bolt in elevation, partly in section, pulled back and securing the plates together. Fig. 5, is a view in elevation of an eye bolt provided with my automatic key in a similar position to that shown in Fig. 3, with relation to the plates to be secured, except the plates are vertical.

Fig. 6 is a view in elevation of the bolt taken at right angles to the other views taken in elevation, with the key omitted. Fig. 7, is an enlarged sectional view of the bolt taken through 7—7 of Fig. 2, showing the key in closed position.

Similar numerals refer to similar parts throughout the several views.

1 is the bolt. 2 is the key which is provided with trunnions 3. Trunnions 3 operate in grooves 4 formed in bolt 1. 5 is a slot in the bolt in which operates key 2. 6 is a nut for setting up the bolt or stud when used for securing or drawing the plates 7 and 8 together. 9 is a washer which is ordinarily used for bolt adjustment to save running the nut up on the thread. 10 is an eye which is useful in certain classes of work for lifting or pulling purposes.

In assembling, the key is inserted as shown in Fig. 1, trunnions 3 freely operating in grooves 4. When the key reaches the point shown in dotted line, it may then be revolved in operative position. By continuing the key down the grooves and continuing the rotation in the same direction, as suggested by the lines in dot, the key will assume the closed position shown in Fig. 2. The only position in which the key may be removed from the bolt, is the position in which it is shown in full lines in Fig. 1.

The positions of trunnions 3, on key 2, are such that the weight of the key, when the bolt is in the vertical, will cause it to open out into the position shown in Fig. 3. When the bolt is inverted from the position shown in Figs. 2 and 3, a slight end tap on the bolt will cause the key to assume a similar position, except that it will be at the outer end of the slot at about the position shown in Fig. 4.

In a horizontal position, turning the bolt into the position shown in Fig. 5, will drop the key into operative position. Taking the bolt as shown in Fig. 5 and by rotating it on its axis, with a little care and manipulation, the key will fall back into inoperative position and the bolt may be removed.

It is found in practice to be very desirable to secure a bolt without an operator on the other side of the work, such as securing plates and shapes together in ship and boiler work, also in inaccessible places, such as removing dents in tanks and ships' sides where a hole may be bored and my improved key stud inserted, and also in confined spaces where there is not enough room to insert a bolt with an ordinary head.

In this specification and claims, when I use the term "bolt" I mean a member in which it is desired to place a holding means.

Having thus described my invention, what I claim and desire to secure by Letters Patent is—

1. A self forming head on a bolt consisting of, a key provided with trunnions near the edge thereof, a bolt provided with longitudinal grooves permitting said key and its formed trunnions to longitudinally enter said bolt and a slot within said bolt permitting said key to revolve in operative position.

2. A bolt provided with a slot in which a key may operate, longitudinal grooves in said bolt extending from the end thereof through which trunnions on said key may enter and a key provided with trunnions operating within said grooves.

3. A key provided with an integral trunnion, a bolt provided with a slot in which said key may operate and with a groove in which said trunnion may enter and hold said key in operative position.

4. A key bolt comprising a bolt provided with a slot in which a key may operate, a key provided with a trunnion, means whereby said key may be inserted within said bolt consisting of a groove near the periphery of said bolt extending from the end thereof into the slot and in which said trunnion may enter and operate.

JOHN WATT.

Witnesses:
WM. McDONNAL,
MASON STARTT.